United States Patent
Kim et al.

(10) Patent No.: US 9,575,647 B2
(45) Date of Patent: Feb. 21, 2017

(54) METHOD AND APPARATUS FOR PROVIDING INFORMATION OF MULTIPLE APPLICATIONS

(75) Inventors: Hyo Young Kim, Seongnam-si (KR); Jae Joon Hwang, Seoul (KR); Ae Jung Seo, Seoul (KR); Seung Woo Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1251 days.

(21) Appl. No.: 13/025,424

(22) Filed: Feb. 11, 2011

(65) Prior Publication Data
US 2011/0197160 A1 Aug. 11, 2011

(30) Foreign Application Priority Data
Feb. 11, 2010 (KR) .................. 10-2010-0013004

(51) Int. Cl.
G06F 3/048 (2013.01)
G06F 3/0488 (2013.01)
G06F 17/24 (2006.01)

(52) U.S. Cl.
CPC ........... G06F 3/0488 (2013.01); G06F 17/241 (2013.01)

(58) Field of Classification Search
CPC . H04N 21/4622; H04N 21/482; G06F 3/0488; G06F 1/1692; G06F 3/017; G06F 3/048; G06F 3/0482; G06F 3/0483; G06F 3/04842; G06F 3/04886
See application file for complete search history.

(56) References Cited

U.S. PATENT DOCUMENTS

| | | |
|---|---|---|
| 2003/0206197 A1 | 11/2003 | McInerney |
| 2005/0164688 A1 | 7/2005 | Satake |
| 2006/0080386 A1* | 4/2006 | Roykkee et al. ............. 709/203 |
| 2006/0264244 A1 | 11/2006 | Choe et al. |
| 2008/0288857 A1 | 11/2008 | Duncan et al. |
| 2008/0297483 A1 | 12/2008 | Kim et al. |
| 2009/0140997 A1 | 6/2009 | Jeong et al. |
| 2009/0160809 A1 | 6/2009 | Yang et al. |
| 2009/0292989 A1* | 11/2009 | Matthews ............. G06F 3/0488 715/702 |
| 2010/0031132 A1 | 2/2010 | Yamaji et al. |

FOREIGN PATENT DOCUMENTS

| | | |
|---|---|---|
| CN | 1649357 A | 8/2005 |
| CN | 1650344 A | 8/2005 |

(Continued)

*Primary Examiner* — Jeffrey A Gaffin
*Assistant Examiner* — Ayesha Huertas Torres
(74) *Attorney, Agent, or Firm* — Jefferson IP Law, LLP

(57) ABSTRACT

A method and apparatus for displaying information of multiple applications simultaneously on the execution screen of a common application is provided. A method for providing information in mobile terminal includes displaying an execution screen having a plurality of information display regions with execution of a common application, detecting an interaction made to one of the information display regions, executing an application related to information presented in the information display region at which the interaction is detected, and displaying original data corresponding to the information presented in the information display region at which the interaction is detected.

19 Claims, 8 Drawing Sheets

(56) References Cited

FOREIGN PATENT DOCUMENTS

| | | |
|---|---|---|
| CN | 101031871 A | 9/2007 |
| JP | 2001-337943 A | 12/2001 |
| JP | 2003-259400 A | 9/2003 |
| JP | 2005-174037 A | 6/2005 |
| JP | 2005-202482 A | 7/2005 |
| KR | 10-2007-0105019 A | 10/2007 |
| KR | 10-2008-0104857 A | 12/2008 |
| KR | 10-2009-0058073 A | 6/2009 |
| KR | 10-2009-0066368 A | 6/2009 |

* cited by examiner

METHOD AND APPARATUS FOR PROVIDING INFORMATION OF MULTIPLE APPLICATIONS

PRIORITY

This application claims the benefit under 35 U.S.C. §119 (a) of a Korean patent application filed on Feb. 11, 2010 in the Korean Intellectual Property Office and assigned Serial No. 10-2010-0013004, the entire disclosure of which is hereby incorporated by reference.

BACKGROUND OF THE INVENTION

1. Field of the Invention

The present invention relates to providing information of multiple applications. More particularly, the present invention relates to a method and apparatus for providing information of multiple applications simultaneously on the execution screen of a common application.

2. Description of the Related Art

With the rapid advance in communication and semiconductor technologies, the use of mobile communication terminals is widespread and increasing. Recent mobile terminals feature mobile convergence for covering the functions of other devices. Typically, recent mobile terminals are provided with various supplementary functions, including a broadcast playback function for supporting Digital Multimedia Broadcasting (DMB) or Digital Video Broadcasting (DVB), an audio file player such as an MP3 player, a camera function, an internet access function, a dictionary function, and the like.

A conventional mobile terminal operates in a single tasking manner in which only the execution screen of a currently running application is displayed. In order to execute an application while another application is running on the mobile terminal, the user must either end the currently running application and execute the new application, or process the current application to run in background and the new application to run in foreground. Accordingly, the conventional mobile terminal has a drawback in which it is difficult to satisfy a user's desire to simultaneously review the information of multiple applications running in parallel.

SUMMARY OF THE INVENTION

An aspect of the present invention is to address at least the above-mentioned problems and/or disadvantages and to provide at least the advantages described below. Accordingly, an aspect of the present invention is to provide a method and apparatus for providing information items of currently-running multiple applications intuitively.

Another aspect of the present invention is to provide a mobile terminal and method for providing information of multiple applications that is capable of display the information items of different applications in an information format of a specific application.

Another aspect of the present invention is to provide a mobile terminal and method for providing information of multiple applications that is capable of providing a user interface with information display regions for the information of multiple applications and displaying detailed information related to the application selected in response to a user interaction made at one of the information display regions.

Another aspect of the present invention is to provide a mobile terminal and method for providing information of multiple applications that is capable of updating the changed information of an application automatically in another application.

In accordance with an aspect of the present invention, a method for providing information in a mobile terminal is provided. The method includes displaying an execution screen having a plurality of information display regions with execution of a common application, detecting an interaction made to one of the information display regions, executing an application related to information presented in the information display region at which the interaction is detected, and displaying original data corresponding to the information presented in the information display region at which the interaction is detected.

In accordance with another aspect of the present invention, an apparatus includes a display unit for displaying an execution screen having a plurality of information display regions, and a control unit for executing an application related to information presented in one of the information display regions to which an interaction is made and for displaying original data corresponding to the information with the execution of the application.

In accordance with another aspect of the present invention, a method of providing information in an apparatus is provided. The method includes displaying an execution screen of a common application on a display of the apparatus, the execution screen including a plurality of information display regions, each of the information display regions corresponding to one of a plurality of applications; detecting a user interaction with one of the information display regions; identifying the information display region corresponding to the user interaction; executing the application corresponding to the identified information display region; and displaying original data corresponding to information contained in the identified information display region, in a format of the executed application.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an exemplary embodiment of the present invention, a plurality of information display regions is provided for an application to display information of multiple other applications. In response to an interaction with one of the information display regions, an application linked to the information display region selected by the interaction is activated so as to provide application-specific information. According to an exemplary embodiment of the present invention, a mobile terminal and method for controlling information is provided such that an application displays the information items of other multiple applications in an application-specific format, executes an application linked to the information presented in the information display region on which user interaction is made, and displays the information on the executed application.

A description is made hereinafter of the structure of a mobile terminal and method for controlling operations of the mobile terminal according to an exemplary embodiment of the present invention with reference to FIGS. 1 to 8. The structure of the mobile terminal and method for controlling the operation of the mobile terminal are not limited to the following description but may be modified according to various exemplary embodiments.

Figure 1:
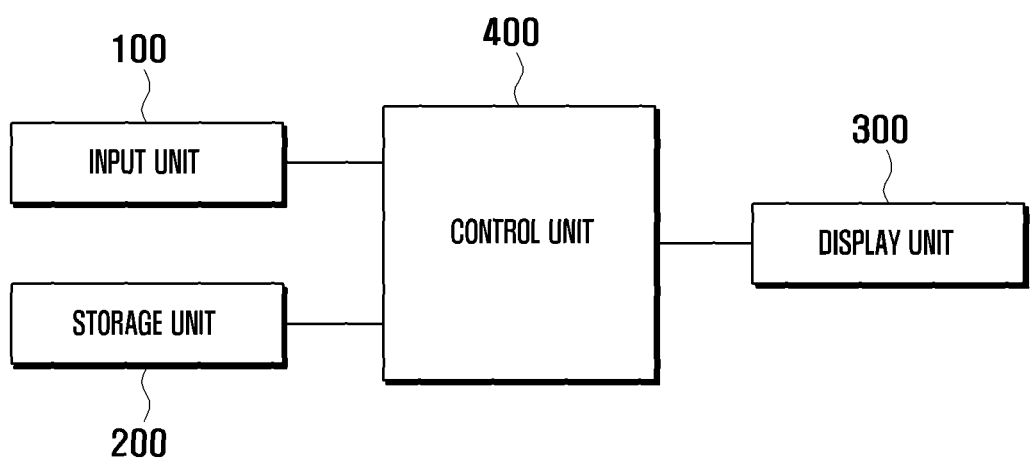
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes an input unit 100, a storage unit 200, a display unit 300, and a control unit 400. While not shown, the mobile terminal may further include a Radio Frequency (RF) unit for radio communication, an audio processing unit having a microphone (MIC) and a speaker (SPK), a digital broadcast module for receiving and playing digital broadcast (e.g. Digital Multimedia Broadcasting (DMB) or Digital Video Broadcasting (DVB)), a camera module for taking a picture, a Bluetooth module for Bluetooth communication, an Internet access module, and other components.

The input unit 100 generates an input signal in response to the user manipulation made thereon and transfers the input signal to the control unit 400. The input unit 100 may include a plurality of buttons. The input unit 100 may include at least one button for generating the input signal for executing applications, information display region selection, and switching between applications.

The storage unit 200 stores various terminal-executable application programs and data, and may include at least one of volatile and nonvolatile memory devices. For example, the storage 200 may store the Operating System (OS) of the mobile terminal, a display control application program and data, and a multiple application information items display application program (e.g., common application) and data. The storage unit 200 may be provided with a storage region for storing the related information while the controlling application displays the actual information items of the controlled application in its data format.

The display unit 300 displays the execution screens of the applications running on the mobile terminal. For example, the display unit 300 may display the execution screens of a messaging function, an email function, an Internet access function, a multimedia function, a search function, a communication function, an electronic book function (e.g., e-book), a video playback function, a photographing function, a picture viewer function, a TV function (e.g., mobile DMB or DVB), an audio playback function (e.g., MP3), a widget function, and the like. The display unit 300 may be implemented with one of a Liquid Crystal Display (LCD), an Organic Light Emitting Diode (OLED), and an Active Matrix OLED (AMOLED). The display unit 300 may be implemented to support a landscape view mode and a portrait view mode.

The display unit 300 may be provided with a touch input unit (not shown) and function as a touchscreen. The touchscreen-enabled display unit 300 may generate an input signal in response of the user interaction made thereon and transfer the input signal to the control unit 400 as described below.

The display unit 300 may display the information of multiple applications on an execution screen of a controlling application. The display unit 300 divides the execution screen of the controlling application into a plurality of information display regions presenting the information of the respective controlled applications. A description of this process is described below. According to an exemplary embodiment of the present invention, the application (i.e., controlling application) which controls display of the information items of multiple other applications (i.e., controlled application) is called a "common application". The terms "multiple application", "single application", "common application", and "execution application" are used for the purpose of simplicity in explanation.

The control unit 400 controls the operations of the mobile terminal. The control unit 400 controls the execution of the common application. The control unit 400 controls such that the information items of the multiple controlled applications are presented in respective information display regions while the common application is running. The control unit 400 controls such that the information items of the multiple controlled applications is converted into the information format of the common (i.e., controlling) application. The information items presented in the respective information display regions may be stored in the storage unit 200 in the display format of the common application. The control unit 400 traces the applications for which information items are displayed in the information display regions, generates a mapping table of the information items and the information display regions, and stores the mapping table in the storage unit 200.

The control unit 400 displays the application items of the multiple controlled applications with the execution of the common application and detects a specific user interaction on one of the information display regions. The control unit 400 retrieves and executes the controlled application linked to the information display in the information display region on which the user interaction is detected. The control unit 400 controls such that the controlled application displays the actual information of the corresponding information item and manages its operations. The control unit 400 may control such that the common application is running in the background.

The control unit 400 controls such that the information items of the multiple controlled applications are displayed in the format of the controlling application, i.e., the common application. If the actual data corresponding to the information item presented in the information display region changes, the information provided in the information display region is updated automatically. The control unit 400 controls the execution of the application linked to the application item to which the user interaction is detected and the display of the information on the execution screen of the common application in the format suitable for the common application. The control unit 400 may also performs control operations related to the operations of the common application and the controlled application. A description of these operations is provided below along with an exemplary method for controlling the operations of the mobile terminal.

The configuration depicted in FIG. 1 may be applied to a mobile terminal implemented in one of a bar type, a fold type, a slide type, a swing type, and a flip type. The mobile terminal may be any of portable information processing devices, multimedia playback devices, and the like. For example, the mobile terminal may be a mobile communication terminal operating with one of various communication protocols, a Portable Multimedia Player (PMP), a digital broadcast player, Personal Digital Assistant (PDA), a music player (e.g., MP3 player), a game console, a tablet, and smart phone. The method for controlling display of information of multiple applications simultaneously by means of a common application according to an exemplary embodiment of the present invention may also be applied to middle and large size devices such as a TV, a Large Format Display (LFD), Digital Signage (DS), a media pole, a Personal Computer (PC), and a laptop computer.

Figure 2:
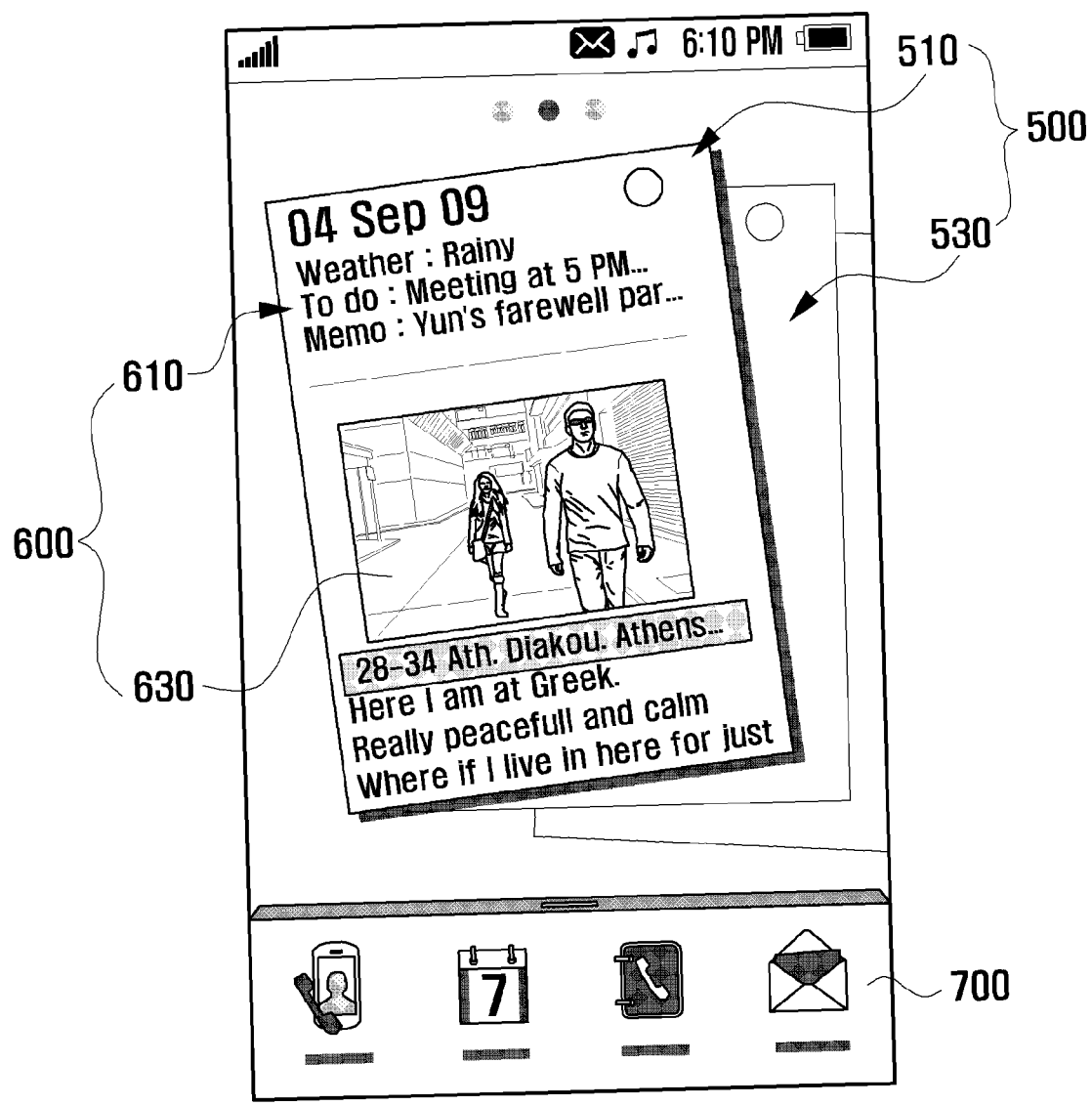
FIG. 2 is a diagram illustrating an exemplary execution screen of a common application according to an exemplary embodiment of the present invention.

FIG. 2 is a diagram illustrating an exemplary execution screen of a common application according to an exemplary embodiment of the present invention.

Referring to FIG. 2, the exemplary execution screen of the common application shows two information items: i.e., photo information and memo information per date. Two or more information items may be displayed (e.g., schedule information and memo information, schedule calendar information and photo information, messaging information and photo information, email information and photo information, photo information and video information, memo information and video information, or schedule information and memo information and photo information) in the corresponding information display regions on the execution screen, but a detailed description on each available combination is omitted herein for brevity.

The display unit 300 displays the execution screen of the common application which includes an information window having a plurality of information pages 500 (510 and 530), each having information display regions 600 (610 and 630), and a menu window 700 having submenu items including at least one of option setting, application execution, and menu execution items. In FIG. 2, the menu window 700 may be hidden. Although FIG. 2 shows that the information window is divided into two information display regions, the number of information display regions may be changed depending on the default setting or a user setting.

The mobile terminal may execute the common application according to a preset configuration. For example, the mobile terminal may execute in the common application in response to the signal made via a shortcut button (not shown) of the input unit 100, a specific type of touch assigned for the execution of the common application, and a menu item selected in the menu window 700.

If the common application execution command is input, the execution screen of the common application is displayed by the display unit 300. The execution screen includes a plurality of information pages, i.e. the first information page 510 and second information page 530. The information pages, except for the top most page, are presented only with contour so as to be selected, via the user interaction, to become the top most page presenting its entire content. Once the common application is executed, the information items corresponding to the controlled applications are displayed in the respective information display regions 610 and 630.

Figure 6:
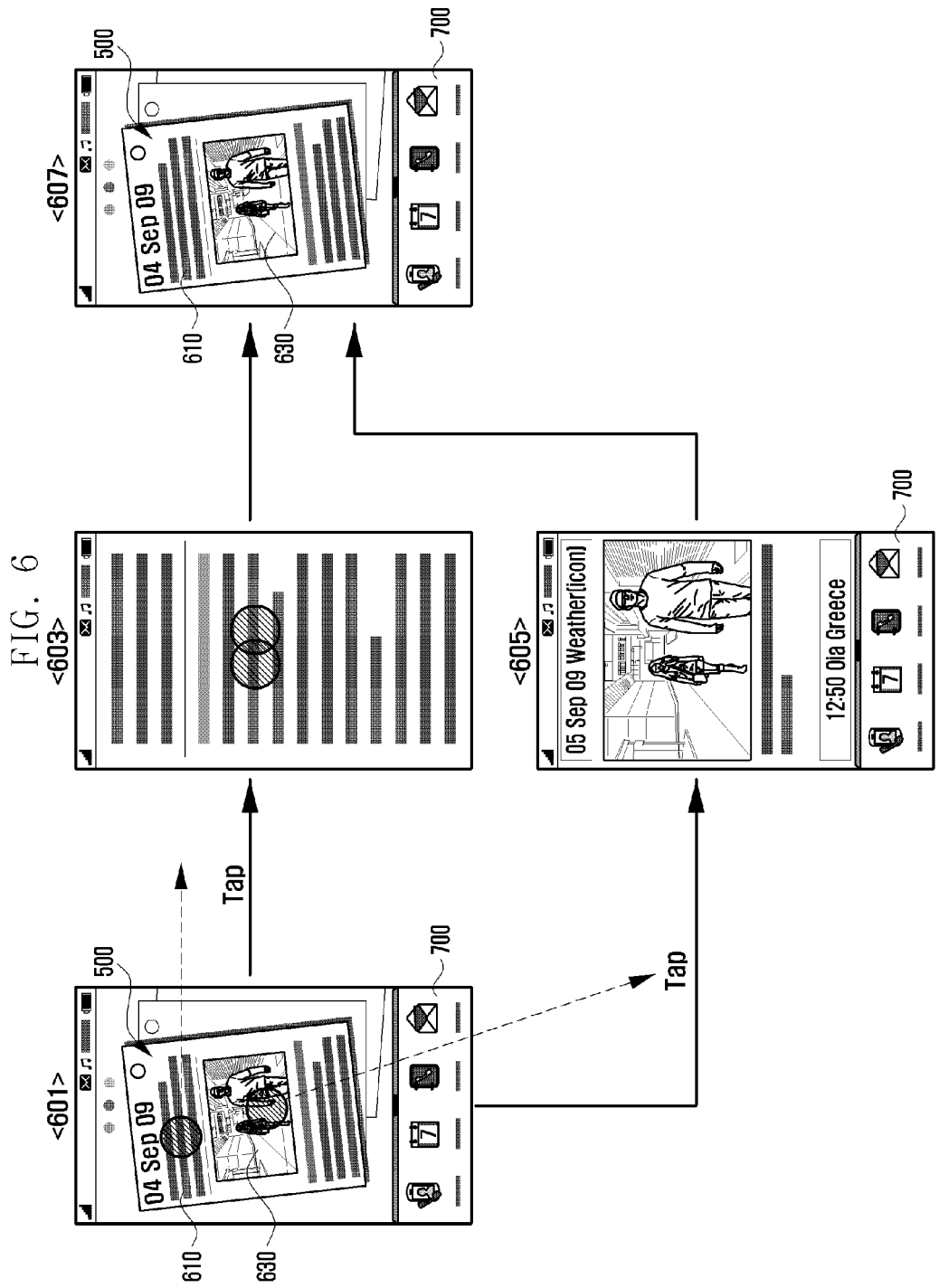
FIG. 6 is a diagram illustrating an operation of a common application in response to a user interaction according to another exemplary embodiment of the present invention.

According to the example shown in FIG. 6, the first information display region 610 presents a memo as the information provided by the memo application, and the second information display region 630 presents a photo as the information provided by the photo application. The memo of the first display region 610 and the photo of the second display region 630 may be created and saved on the same date. The information pages 500 may be configured such that the information display region 600 has an area for presenting the date information. According to an exemplary embodiment of the present invention, the first information display region, the second information display region, the memory application, the photo application, the first execution screen, the second execution screen are distinguished for the sake of explanation.

The information items displayed in the information display regions may be the information items of the controlled applications that are formatted suitable for the common application. For example, the memo item presented in the first information display region 610 may be obtained by converting the memo created and saved by the memo application as a controlled application into the format suitable for the common application. Similarly, the photo item presented in the second information display region 630 may be obtained by converting the photo created and saved by the photo application as another controlled application into the formation suitable for the common application. Each information item may be provided in the form of a still image or an animation depending on the type of the controlled application.

Figure 3:
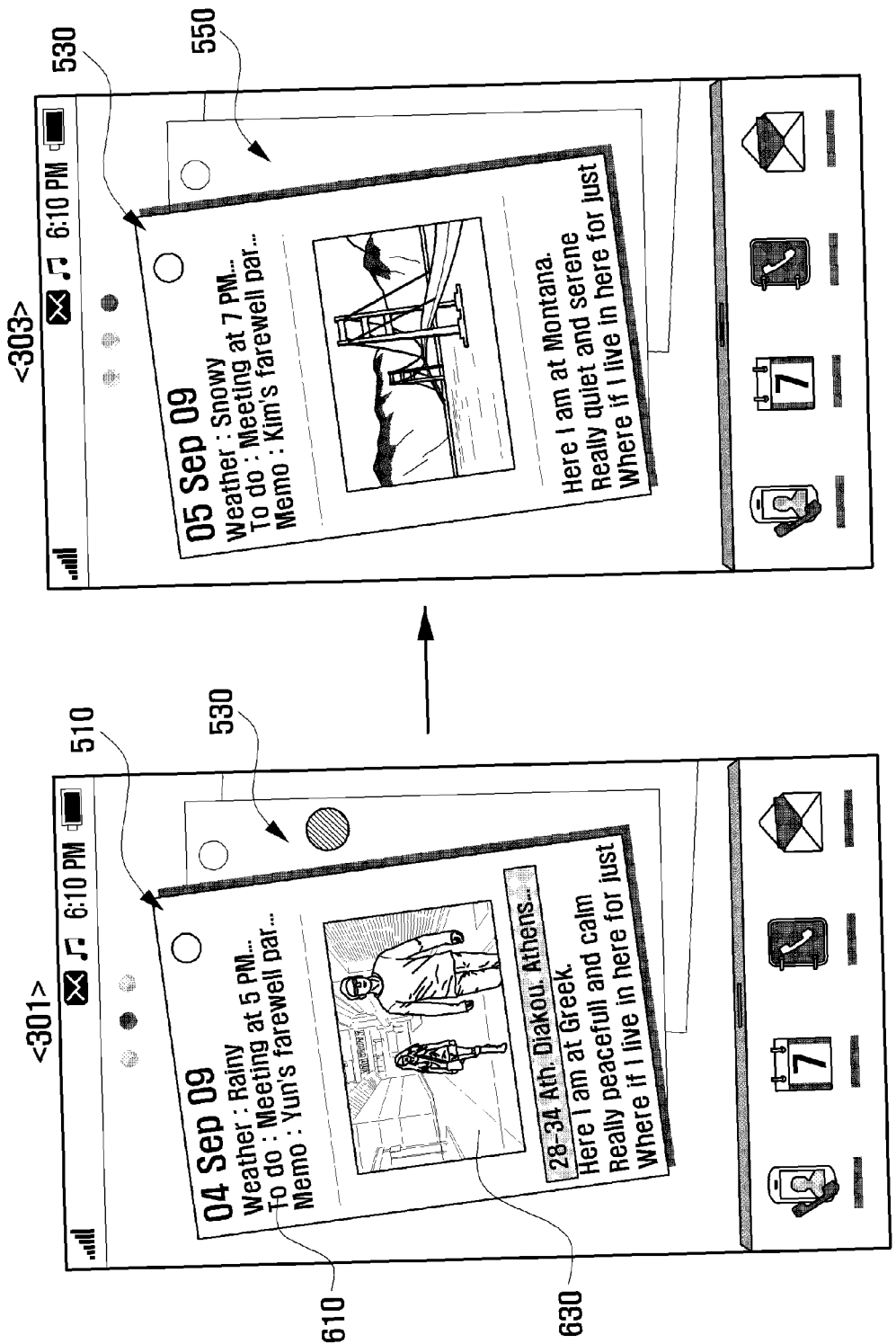
FIG. 3 is a diagram illustrating an operation of switching between information pages provided by a common application according to an exemplary embodiment of the present invention.

FIG. 3 is a diagram illustrating an operation of switching between information pages provided by a common application according to an exemplary embodiment of the present invention.

Referring to FIG. 3, the execution screen of the common application is displayed on the display unit 300. The execution screen includes the first information page 510 and the second information page 530 as shown in the screen image 301. The first information page 510 has the first information display region 610 for displaying an item and the second information display region 630 for displaying a photo.

While the first information page 510 is shown as the top most page, the second information page 530 may be switched with the first information page 510 to be a new top most page. For example, the user may make an interaction for selecting the second information page 530 as shown in the screen image 301. The user interaction may be the command for selecting the second information page 530 or switching to another information page. The user interaction may be made in the form of a touch input such as tap, swipe, flick, and drag.

When the user interaction is detected, the second information page 530 is activated to be displayed as the top most page on the display unit 300 as shown in the screen image 303. The information items presented in the first and second information pages 510 and 530 may be created on the same date or different date. The execution screen may be configured such that, when the second information page is selected as the top most page, the first information page disappears and the contour of the third information page 550 appears. If only the first and second information pages 510 and 530 exist, the contour of the first page may appear under the second page as the top most page.

Figure 4:
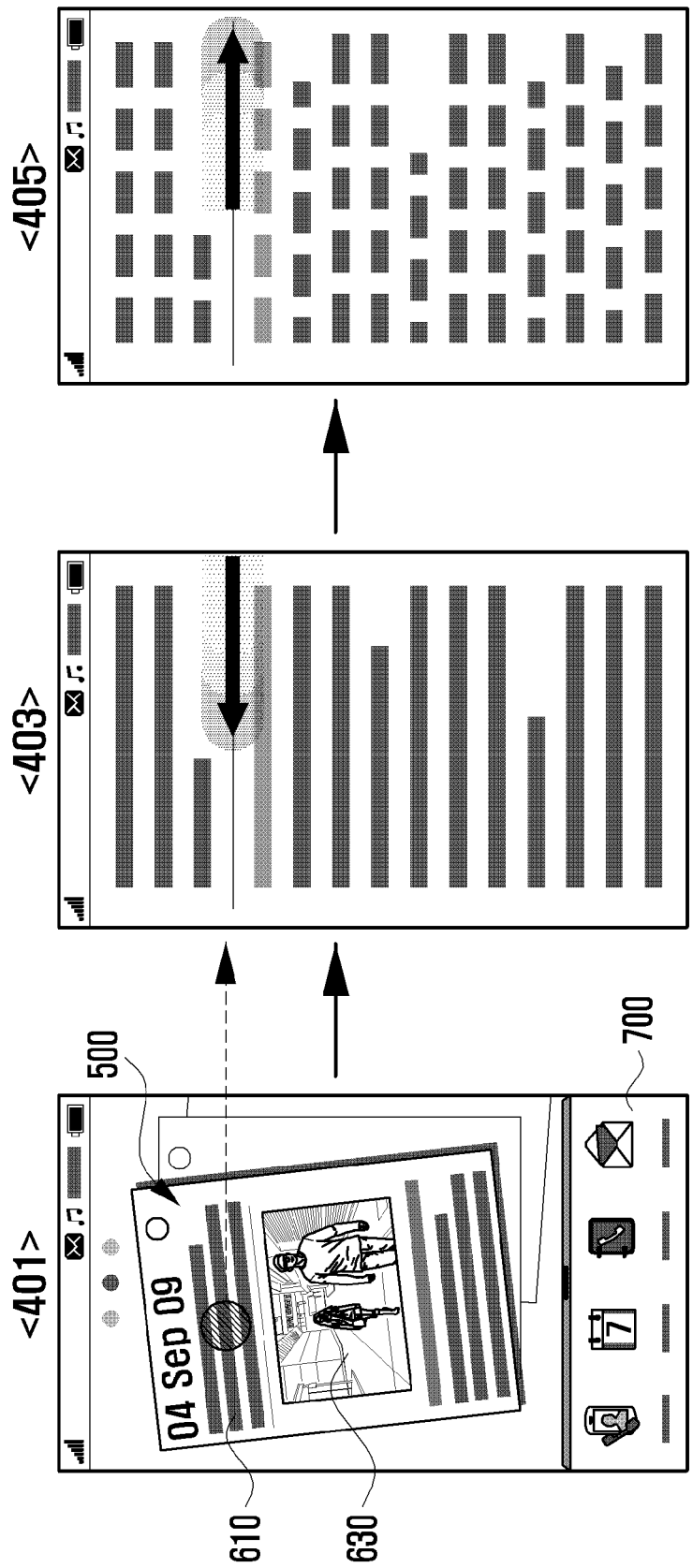
FIG. 4 is a diagram illustrating an operation of an execution screen of a common application in response to a user interaction according to an exemplary embodiment of the present invention.

FIG. 4 is a diagram illustrating an operation of an execution screen of a common application in response to a user interaction according to an exemplary embodiment of the present invention.

Referring to FIG. 4, the common application execution screen having the information pages 500 is displayed on the display unit 300 as shown in the screen image 401. As described above, each information page 500 includes the first information display region 610 for presenting the memo and the second information display region 630 for presenting the photo. The memo data created by the original memo application may be converted so as to be displayed in the format suitable for the common application, and the photo data created by the original photo application may be converted so as to be displayed in the format suitable for the common application. The photo data may be provided in the form of a picture with or without other recorded data, such as place and time where the scene is taken and related comments.

While the common application execution screen is displayed, a user interaction may be made on the information display regions 600. For example, if the user interaction is detected at the first information display region 610, the mobile terminal executes the application (e.g., memo application) linked to the information (e.g., memo) presented in the first information display region 610. If the user interaction is detected at the second information display region 630, the mobile terminal executes the application (e.g., photo application) linked to the information (e.g., photo) presented in the second information display region 630. In FIG. 4, it is assumed that the user interaction is detected at the first information display region 610.

While the common application execution screen is displayed as shown in the screen image 401, it is possible to check the detailed information (e.g., original data) about the memo information presented with the first information display region 610 according to the user interaction. For example, the user may make a user interaction for selecting the first information display region 610 in which the memo information is presented. The user interaction may be made by selecting a key of the input unit 100 or by touching the first information display region 610 on the display unit 300.

If the user interaction is detected at the first information display region, the memo application is executed such that the execution screen of the memo application is displayed as shown in the screen image 403. For example, upon detecting the user interaction made to the first information display region 610, the control unit 400 checks the application (e.g., the memo application) which has created the information presented in the first information display region 610. The control unit 400 retrieves the original data (e.g., memo data) corresponding to the information presented in the first information display region 610 and displays the original memo data on the memo application execution screen. As shown in the screen image 403, the original memo data including the memo information presented in the first information display region 610 are displayed on the memo application execution screen.

While the memo application execution screen 403 is displayed, it is possible to edit the onscreen memo data and navigate to other memo data (e.g., previous and next memos). How to edit the onscreen memo data is described below.

While the memo application execution screen 403 is displayed, the user may input a user interaction for navigating to the previous or next data. As shown in FIG. 4, the user interaction is for navigating to the previous data. For example, a swipe touch may be made from left to right at a specific region of the screen 403 on the display unit 300. Such a screen change interaction may also be made by selecting a key (e.g., navigation key) of the input unit 100.

In response to the previous page navigation request interaction, the onscreen memo data as shown in the screen image 403 is replaced by the previous memo data as shown in the screen image 405. The terms "previous memo data" and "next memo data" are used for the sake of explanation. For example, the previous memo data shown in the screen image 405 is the one created and saved previously as compared to the memo data shown in the screen image 403, and the onscreen and previous memo data may be created and saved on the same date or different dates.

Although not depicted in FIG. 4, it is possible for the user to input a user interaction for displaying the next memo data while the application execution screen as shown in the screen images 403 and 405 is displayed on the display unit 300. According to the user interaction, the onscreen memo data may be changed by the next memo data. For example, if a touch action swiping from right to left is made at a specific region on the display unit 300 while the memo application execution screen as shown in the screen image 403 or 405 is displayed, the next memo data is displayed in the memo application execution screen.

Figure 5:
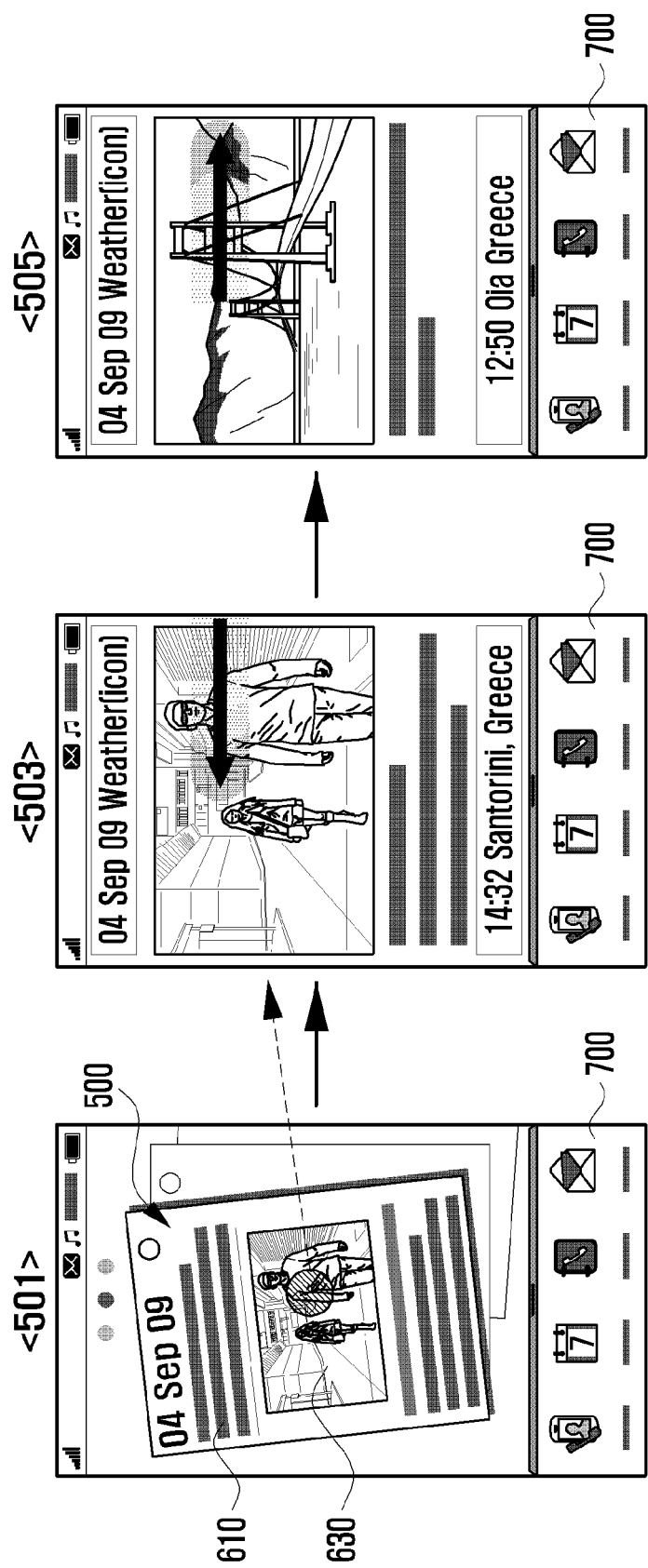
FIG. 5 is a diagram illustrating an operation of a common application in response to a user interaction according an exemplary embodiment of the present invention.

FIG. 5 is a diagram illustrating an operation of a common application in response to a user interaction according to an exemplary embodiment of the present invention.

Referring to FIG. 5, a common application execution screen having the information pages 500 is displayed on the display unit 300 as shown in the screen image 501. Each information page 500 includes the first information display region 610 presenting a memo and the second information display region 630 presenting a photo. The memo is presented by converting the memo data created and saved by a memo application into a data format suitable for the common application, and the photo is presented by converting the photo data created and save by a photo application into the data format suitable for the common application.

The user may make a user interaction at an information display region 600 of the execution screen of the common application as shown in the screen image 501. When the user interaction is made at the first information display region 610, the application (e.g., memo application) which has created the information presented in the first information display region 610 is executed. When the user interaction is made at the second information display region 630, the application (e.g., photo application) which has created the information presented in the second information display region 630 is executed. In FIG. 5, it is assumed that the interaction is made at the second information display region.

The user may check the detailed information (e.g., original data) of the photo presented in the second information display region 630 by making the user interaction at the second information display region 630 as shown in the screen image 501. The user may make the user interaction for selecting the second information display region 630 presenting the photo as shown in the screen image 501. The user interaction may be made by selecting a key of the input unit 100 or by touching a second information display region 630.

If the user interaction is detected, the photo application is executed with the photo application execution screen as shown in the screen image 503. The original photo data corresponding to the photo information presented in the second information display region 630 as shown in the screen image 503. For example, if the user interaction is detected at the second information display region 630, the control unit 400 checks the application (photo application) that created the information presented in the second information display region 603 and executes the application. Once the photo application is executed, the control unit 400 retrieves the original photo corresponding to the information displayed in the second information display region 630 and controls to display the retrieved original photo. The original photo data may be displayed in the enlarged form of the photo presented in the second display region 630 with the related information.

While the photo application is activated as shown in the screen image 503, it is possible to edit the onscreen photo data and navigate to other photo data (e.g., previous and next photos). How to edit the onscreen photo data is described below.

While the photo application is activated as shown in the screen image 503, the user may make an interaction for navigating to the previous or next photo. In FIG. 5, the user makes an interaction for navigating to the previous photo. For example, a swipe touch may be made from left to right at a specific region of the screen 503 on the display unit 300. Such a screen change interaction may also be made by selecting a key (e.g., navigation key) of the input unit 100.

In response to the previous page navigation request interaction, the onscreen photo data as shown in the screen image 503 is replaced by the previous photo data as shown in the screen image 505. The terms "previous photo data" and "next photo data" are used for the sake of explanation. For example, the previous photo data shown in the screen image 505 is the one created a saved previously as compared to the photo data shown in the screen image 503, and the onscreen and previous photo data may be captured as saved on the same data or different dates.

Although not depicted in FIG. 5, it is possible for the user to input a user interaction for displaying the next photo data while the application execution screen as shown in the screen image 503 and 505 is displayed on the display unit 300. According to the user interaction, the onscreen memo data may be changed by the next photo data. For example, if a touch interaction swiping from right to left is made at a specific region on the display unit 300 while the photo application execution screen as shown in the screen image 503 or 505 is displayed, the next photo data is displayed in the photo application execution screen.

FIG. 6 is a diagram illustrating an operation of a common application in response to a user interaction according to another exemplary embodiment of the present invention.

Referring to FIG. 6, the common application execution screen having the information pages 500 is displayed on the display unit 300 as shown in the screen image 601. Each information page 500 includes the first information display region 610 for presenting a memo and the second information display region 630 for presenting a photo.

The user may make a user interaction at an information display region 600 of the execution screen of the common application as shown in the screen image 601. If the user interaction is made at the first information display region 610, the memo application which has created the information presented in the first information display region 610 is executed such that the execution screen of the memo application is displayed on the display unit 300. If the user interaction is made at the second information display region 630, the photo application which has created the information presented in the second information display region 630 is executed such that the execution screen of the photo application is displayed on the display unit 300.

It is possible to switch between the controlled application execution screens and the common application execution screen according to a preset configuration. For example, switching between application execution screens may be requested via a shortcut key (not shown), a double tap on the display unit 300, or a menu for requesting a previous item. In FIG. 6, it is assumed that the user interaction is made by a double tap.

If a double tap interaction is detected at a specific region while the controlled application execution screen is displayed, the controlled application execution screen, i.e., the memo application execution screen 603 or the photo application execution screen 605, is replaced by the previous screen. The controlled application execution screen is replaced by the common application execution screen 607 in response to the double tap interaction.

Figure 7:
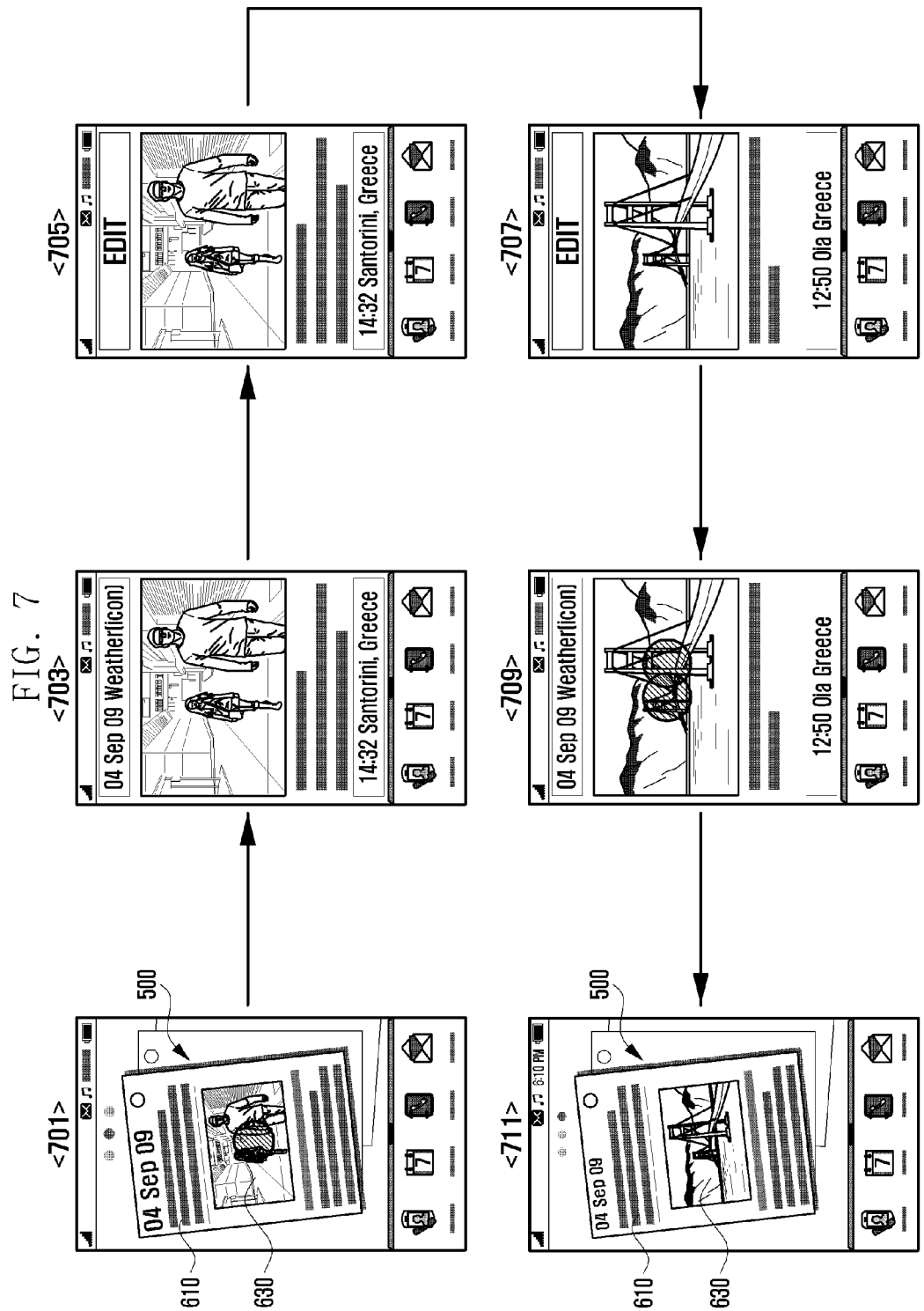
FIG. 7 is a diagram illustrating how to edit original data created by a controlled application in a common application according to an exemplary embodiment of the present invention.

FIG. 7 is a diagram illustrating how to edit original data created by a controlled application in a common application according to an exemplary embodiment of the present invention.

Referring to FIG. 7, the common application execution screen having the information pages 500 is displayed on the display unit 300 as shown in the screen image 701. Each information page 500 includes the first information display region 610 for presenting a memo and the second information display region 630 for presenting a photo.

The user may make an interaction to the first information display region 610 to execute the memo application which has created the memo or to the second information display region 630 to execute the photo application which has created the photo. In FIG. 7, the user interaction is made at the second information display region 630 such that the photo application is executed with its execution screen as shown in the screen image 703. The execution screen 701 of the photo application shows the original photo data corresponding to the photo presented in the second information display region 630.

While the photo application execution screen 703 is displayed, it is possible to edit the photo data presented thereon. For example, the user may make an interaction by selecting a shortcut button, taking a preset gesture on the display unit 300, or selecting a menu item for editing the photo data. If the photo data-editing interaction is input, an editing mode screen is displayed as shown in the screen image 705.

While the editing mode screen 705 is activated, the user may edit at least one of the photo itself and related information. For example, the onscreen photo may be changed along with the related information as shown in the screen image 707. The photo edit operation may be done with an editing tool supporting photo attachment, memo input, photo modification, graphical effect addition, and the like. When an editing complete command is input while the editing mode screen is provided as shown in the screen image 707, the mobile terminal ends the editing mode and displays the edited photo data on the photo application execution screen as shown in the screen image 709.

The photo application execution screen 709 may be replaced by the common application execution screen in a predetermined manner. For example, switching from the photo application execution screen to the common application execution screen may be done by selecting a shortcut button (not shown) of the input unit 100, making a double tap gesture on the display unit 300, or selecting a menu item assigned for returning to the common application execution screen. In FIG. 7, the user interaction is the double tap on the display unit 300.

If the interaction for returning to the common application execution screen is made on the display unit 300 while the photo application execution screen is displayed as shown in the screen image 709, the control unit 400 controls such that photo application execution screen is replaced by the common application execution screen having the information page 500 as shown in the screen image 711. The first information display region 610 of the information page 500 in the screen image 711 shows the same memo as that displayed in the screen image 701. However, the second information display region 630 of the information page 500 in the screen image 711 shows the photo different from that displayed in the screen image 701. The common application execution screen 711 is displayed with the second information display region having the photo edited through the editing steps represented by the screen images 705 to 709. In this manner, it is possible to edit the data of the controlled application which is used in the common application without executing the controlled application.

Although not depicted in FIG. 7, the memo information presented in the first information display region may be edited in the same manner. For example, the user may load the original memo data with the memo application within the common application by making an interaction to the first information display region 610 and edit the loaded original memo data while the common application execution screen 701 is displayed. Once the memo is edited completely and the common application execution screen is displayed, the edited memo is presented in the first information display region 610. Although not described in detail, both the memo information and the photo information may be edited in a similar manner.

Figure 8:
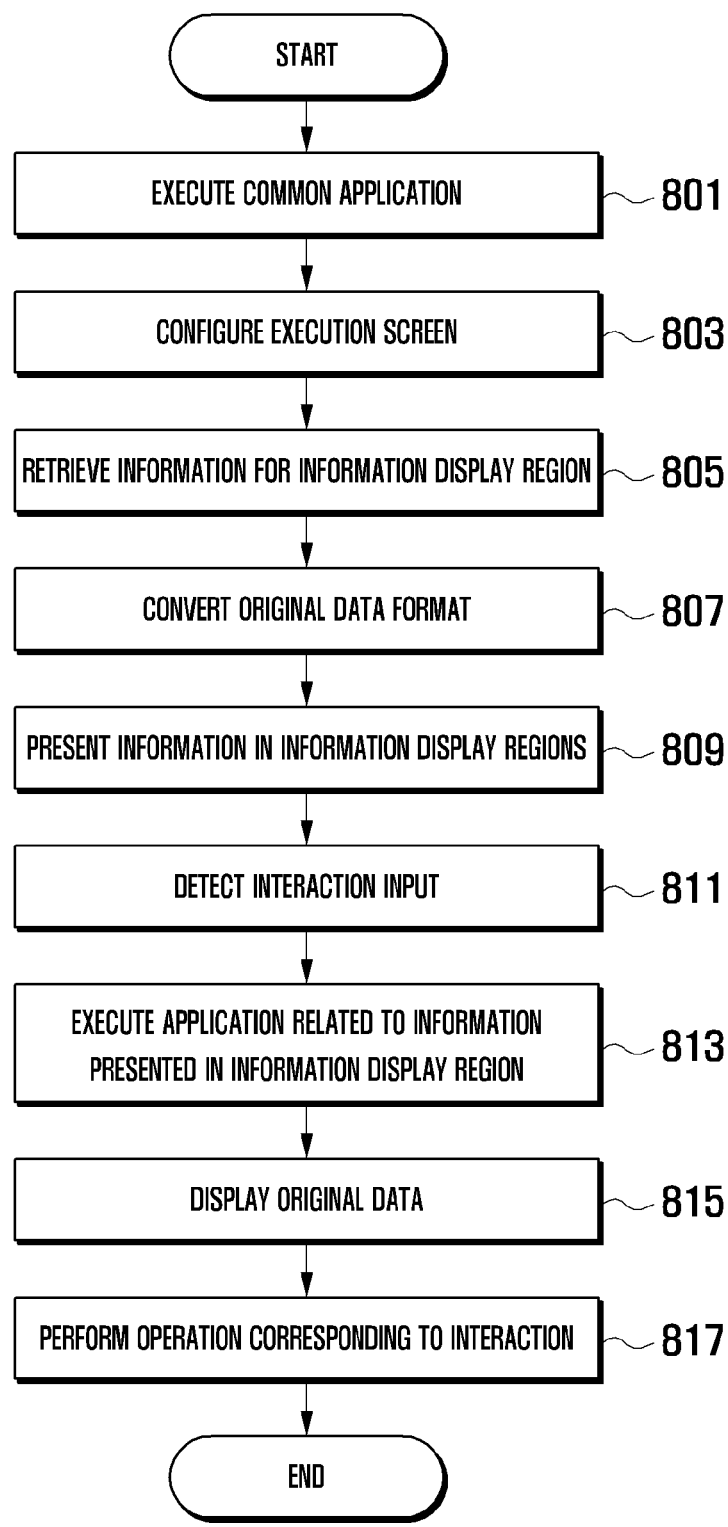
FIG. 8 is a flowchart illustrating a method for providing information of multiple applications in a mobile terminal according to an exemplary embodiment of the present invention.

FIG. 8 is a flowchart illustrating a method for providing information of multiple applications in a mobile terminal according to an exemplary embodiment of the present invention.

Referring to FIG. 8, the control unit 400 executes the common application in step 801. The control unit 400 configures the execution screen of the common application which has the information pages 500 in step 803. For example, the control unit 400 checks the number of required information display regions 600 and configures the information page having the information display regions (e.g., the first information display region 610 and the second information display region 630) based on the number of information display regions. The control unit 400 retrieves the information items to be presented in the top most information page (e.g., the information page 510) in step 805. For example, the control unit 400 may trace the data addresses of the information to be presented in the first information display region 610 and the second information display region 630.

The control unit 400 converts the original data corresponding to the information items into the format suitable for the common application in step 807. For example, the control unit 400 converts the original data retrieved from the data addresses into the display format suitable for the first and second information display regions 610 and 630 at step 807. The control unit 400 controls such that the reformatted information items are presented in the first and second information display regions 610 and 630 respectively in step 809.

The control unit 400 detects a predetermined user interaction input while the information items of the multiple applications are presented in the first and second information display regions 610 and 630 in step 811. For example, if a user interaction is made by the user at one of the first and second information display regions 610 and 630, the control unit 400 detects the input signal corresponding to the user interaction.

If the user interaction is detected, the control unit 400 executes the application related to the information presented by the information display region on which the user interaction is made in step 813. For example, if the user interaction is detected on the first information display region 610, the control unit 400 controls to check and execute the application created the information presented in the first information display region 610. If the user interaction is detected on the second information display region 630, the control unit 400 controls to check and execute the application created the information presented in the second information display region 630. In FIG. 8, the description is made under the assumption that the information items presented by the first and second information display regions 610 and 630 are created by different applications. However, the information items presented by the first and second information display regions 610 and 630 may be information items created by the same or similar applications. This is determined based on the types of the information supported by the information display regions and the applications which the user designates for the information display regions.

With the execution of the application, the control unit 400 controls such that the original data created by the executed application is displayed on the screen in step 815. For example, if the application related to the information presented in the first information display region 610 is executed, the control unit 400 retrieves the original data corresponding to the information and displays the retrieved original data on the screen of the display unit 300. If the application related to the information presented in the second information display region 610 is executed, the control unit 400 retrieves the original data corresponding to the information and displays the retrieved original data on the screen of the display unit 300.

The control unit 400 controls to perform the operation corresponding to the interaction input in the state where the original data of the application is displayed in step 817. For example, a user interaction requesting for navigating to the previous data or the next data (e.g., a swipe interaction) may be made in the state where the original data is displayed. If the user interaction for navigation to the previous or next data is detected, the control unit 400 controls such that the previous or next data are displayed on the screen as described with reference to FIGS. 4 and 5.

The input user interaction may be the one for switching from the controlled application execution screen to the common application execution screen (e.g., a double tap interaction). When the execution screen switch interaction is detected, the control unit 400 controls such that the controlled application ends with the activation of the execution screen of the common application as described with reference to FIG. 6.

The input user interaction may be the one for entering the editing mode (e.g., tap interaction or edit menu selection interaction). When the editing mode entry interaction is detected, the control unit 400 controls such that the mobile terminal enters the editing mode in which the original data is edited in response to the user request as described with reference to FIG. 7. Once the edit process has completed, the control unit ends the editing mode and controls such that the edited data are displayed on the screen. The control unit 400 controls such that the controlled application ends with the presentation of the common application execution screen. The edited information is presented in the corresponding information display region of the common application execution screen as converted to the format suitable for the common application. The control unit 400 may control such that the respective information display regions are updated automatically with the edited information.

The above-described method for providing information items of multiple applications simultaneously with a single application and controlling execution of the applications providing the information items may be implemented in the form of program commands that may be executed by means of various types of computers and recorded in a computer-readable storage medium. The computer-readable storage medium may include at least one of program command, data file, and data structure. The program commands recorded in the storage medium may be the ones designed and structured for the present invention or well-known to those skilled in the computer software field.

The computer-readable storage medium may be any of magnetic media including hard disk, floppy disk, and magnetic tape, optical media including Compact Disc Read Only Memory (CD-ROM) and Digital Versatile Disc (DVD); magneto-Optical Media including Floptical Disk; Read Only Memory (ROM); Random Access Memory (RAM); and Flash memory that may be configured to store the program commands. The program commands include high-level language codes that may be executable in a computer with an interpreter as well as machine language code produced by a complier. The hardware device may be configured to operate with more than one software module for performing any of the operations described herein.

As described above, the method and apparatus for providing information items of multiple applications according to exemplary embodiments of the present invention is advantageous to display the information provided by multiple applications in a combined manner and manage the information in the format suitable for a common application. The method and apparatus for providing information items of multiple applications according to exemplary embodiments of the present invention is capable of providing an optimum environment for displaying the information items provided by multiple applications and accessing and managing the original information through a common application, resulting in improvement of user's convenience. The method and apparatus for providing information items of multiple applications according to exemplary embodiments of the present invention is capable of editing the original information provided the various applications with a common application activating the respective applications, resulting in improvement of utilization of the mobile terminal and the user convenience and product competitive power.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for providing information in a mobile terminal, the method comprising:
    displaying at least one common application execution screen having a plurality of information display regions, each information display region corresponding to a different application and comprising information related to the different application;
    detecting an interaction made to one of the information display regions;
    executing an application corresponding to the information display region at which the interaction is detected; and
    switching to the executing application,
    wherein the switching to the executing application comprises replacing the common application execution screen with an application screen corresponding to the executing application.

2. The method of claim 1, wherein the displaying of the at least one common application execution screen comprises:
    configuring the at least one common application execution screen to have the first and second information display regions;
    converting original data to be provided by the first and second information display regions into the information in a format suitable for the at least one common application execution screen; and
    presenting the information in the first and second information display regions, respectively.

3. The method of claim 2, further comprising:
executing, when an interaction is made to one of the first and second information display regions, the application related to the information presented in the information display region to which the interaction is made; and
displaying, in the application screen, the original data corresponding to the information presented in the corresponding one of the first and second information display regions.

4. The method of claim 3, further comprising:
detecting an interaction input in a state where the original data is displayed; and
navigating to display one of previous and next data in response to a navigation request interaction.

5. The method of claim 3, further comprising:
detecting an interaction input in a state where the original data is displayed; and
displaying the at least one common application execution screen with termination of the application in response to the interaction.

6. The method of claim 3, further comprising:
detecting an interaction input in a state where the original data is displayed; and
switching to an editing mode in response to the interaction.

7. The method of claim 6, further comprising updating the information presented in the plurality of information display regions automatically whenever the original data is modified in the editing mode.

8. The method of claim 7, further comprising:
modifying the original data in the editing mode;
ending the editing mode after completing modification of the original data;
displaying the modified original data;
displaying, when the application is deactivated, the at least one common application execution screen; and
presenting the information corresponding to the modified original data in corresponding information display region in a format suitable for the at least one common application execution screen.

9. The method of claim 3, further comprising:
detecting an interaction input in a state where the original data is displayed; and
ending the executed application and displaying the at least one common application execution screen in response to the interaction.

10. The method of claim 3, wherein the application related to the information presented in the first information display region and the application related to the information presented in the second information display region differ from each other in type.

11. An apparatus comprising:
a display unit configured to display at least one common application execution screen having a plurality of information display regions, each information display region corresponding to a different application and comprising information related to the different application; and
a control unit configured to:
execute an application corresponding to one of the information display regions to which an interaction is made, and
switch to the executing application by replacing the common application execution screen with an application screen corresponding to the executing application.

12. The apparatus of claim 11, wherein the plurality of information display regions present the information in a display format suitable for the at least one common application execution screen.

13. The apparatus of claim 12, wherein the control unit is further configured to trace a data address of information to be provided in a first information display region of the plurality of information display regions and a data address of information to be provided in a second information display region of the plurality of information display regions for configuring the at least one common application execution screen.

14. The apparatus of claim 13, wherein the control unit is further configured to convert original data retrieved from the data addresses into a format supported by the first and second information display regions.

15. The apparatus of claim 13, wherein the control unit is further configured to update the information presented in the plurality of information display regions whenever original data corresponding to the information presented in the plurality of information display regions is modified.

16. The apparatus of claim 13, wherein the apparatus is a mobile terminal.

17. A method of providing information in an apparatus, the method comprising:
displaying at least one common application execution screen on a display of the apparatus, the at least one common application execution screen having a plurality of information display regions, each of the information display regions corresponding to one of a plurality of applications and comprising information related to the corresponding one of the plurality of applications;
detecting a user interaction with one of the information display regions;
identifying an information display region corresponding to the user interaction;
executing the application corresponding to the identified information display region; and
displaying, in place of the common application execution screen, an application screen corresponding to the executing application, in a format of the executing application.

18. The method of claim 17, further comprising:
converting original data of each of the plurality of applications into a common format supported by the at least one common application execution screen; and
displaying the original data of each of the applications in the corresponding information display region.

19. The method of claim 17, wherein the apparatus is a mobile terminal.

* * * * *